May 7, 1935.  W. S. BRINK  2,000,877
VEHICLE WHEEL
Filed June 21, 1933
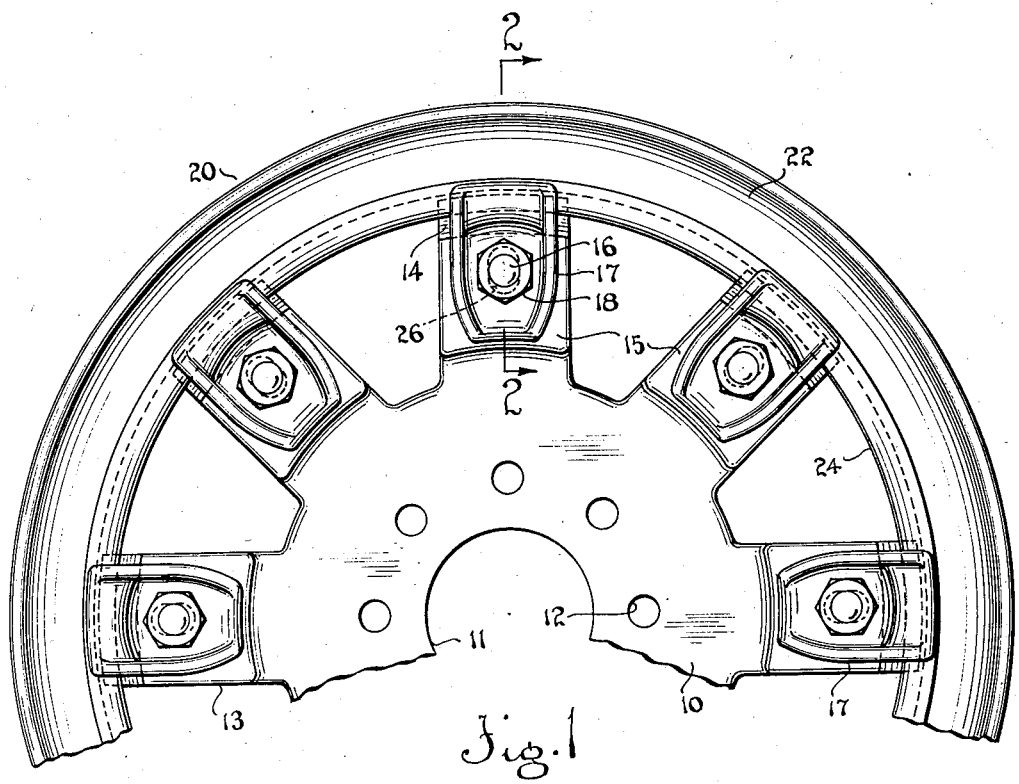
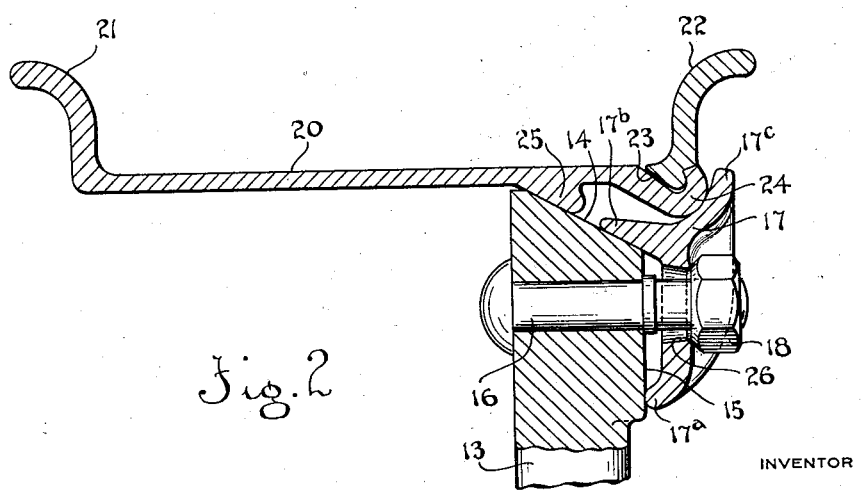
INVENTOR
Winfield S. Brink
BY
Ely & Barrow
ATTORNEYS Patented May 7, 1935

2,000,877

UNITED STATES PATENT OFFICE 2,000,877

VEHICLE WHEEL

Winfield S. Brink, Akron, Ohio, assignor to The Firestone Steel Products Company, Akron, Ohio, a corporation of Ohio Application June 21, 1933, Serial No. 676,770

2 Claims. (Cl. 301—12)

This invention relates to vehicle wheels such as are equipped with rims for pneumatic tires, and more especially it relates to vehicle wheels of the character mentioned wherein the felloe or spokes of the wheel are connected to the rim adjacent one lateral margin of the latter.

Wheels of this character as usually constructed have a single line or point contact with the felloe or spokes, which contact usually is made against the sloped surface of the marginal gutter portion of the rim, within which gutter the removable tire-retaining flange of the rim is mounted. This construction frequently results in the rims being eccentrically mounted, or being forced to eccentric position by laterally directed forces incidental to use.

The chief objects of this invention are to provide a wheel construction of the character mentioned, wherein the rim initially may be accurately mounted concentrically of the wheel; and that will more effectively retain said concentricity in use. More specifically, the invention aims to provide two points of support for the rim on every wheel, said points being disposed transversely of the rim so that one is nearer the middle of the rim than the other.

Of the accompanying drawing:

Figure 1 is a side elevation of a vehicle wheel embodying the invention in its preferred form, a part thereof being broken away; and Figure 2 is a section on the line 2—2 of Figure 1.

Referring to the drawing, the improved vehicle wheel comprises a unitary hub and spoke structure 10 that may be a metal casting as shown, and is formed with the usual axial aperture 11 for an axle, and an annular series of bolt holes 12, 12 to receive the bolts that secure the wheel to the axle. Each spoke, designated 13, of the wheel has its outer end face 14 sloped or beveled toward the front face of the spoke, and said front face has a smooth-finished surface 15 at the outer end of the spoke. Permanently mounted in the end portion of each spoke is a bolt 16 that receives a rim-clamp 17, and a nut 18 for urging said clamp against the rim to seat the latter on the spoke-ends.

The wheel includes a rim 20 for supporting a pneumatic tire (not shown), said rim having the usual integral flange 21 on one lateral margin and a removable split flange 22 on the other margin thereof, said removable flange being seated in a gutter 23. The gutter 23 is formed by the marginal portion of the rim which slopes obliquely inwardly and radially outwardly, as shown at 24, Figure 2. Spaced from the gutter portion 24 of the rim, toward the central plane of the rim, the inner periphery of the latter is formed with a circumferential rib 25 that is beveled complementally to the bevel of end-face 14 of the spokes 13, and is adapted to seat upon said spokes when the rim is mounted on the wheel.

Each of the rim-clamps 17 is formed with a rounded inner end portion 17a that bears against the finished front face 15 of a spoke, a wedge-shaped rearwardly projecting portion 17b engaging the beveled end 14 of the spoke, and an arcuate upper end-portion 17c that engages the gutter-portion 24 of the rim on its concave surface. The clamp also is formed with a radially disposed slot 26 through which the bolt 16 extends.

The arrangement is such that when the rim 20 is mounted upon the spokes 13 the latter engage the beveled rib 25 with their beveled outer ends 14. As the clamps 17 are applied by setting up of the nuts 18, their tapered projections 17b move laterally inwardly and radially outwardly upon the sloped surfaces 14 of the spokes. The clamps are permitted so to move by reason of their bolt-slots 26, the result being that such movement is applied to the gutter portion 24 of the rim through the arcuate portions 17c of the clamps. This forces the beveled rib 25 securely onto its seats on the spokes.

The invention provides two spaced points of support for the rim on each spoke, one being nearer the middle of the rim and carrying the bulk of the load, and the other being at the margin of the rim and acting to stabilize the mounting against laterally applied forces and keeping the ring more effectively in alignment and concentricity than if the rim was supported at one point only. Both points of support however, are adjacent the margin of the rim, on the same side of the central plane of the latter. In the initial application of the rim more accurate alignment of the latter is effected by reason of the centering action exerted by the clamps.

Modification may be resorted to without departing from the spirit of the invention or the scope of the appended claims, which are not limited wholly to the specific construction shown and described.

What is claimed is:

1. In a vehicle wheel, the combination of a hub and spoke structure, the spokes of which have beveled end faces, an annular rim formed with an annular marginal gutter and an annular beveled rib axially spaced from said gutter, said gutter and rib extending radially inwardly of the inner periphery of the base of said rim for supporting the rim on said beveled end faces of the spokes, and clamps mounted on said spoke ends and engageable with the marginal portions of said rim, each of said clamps comprising a fulcrum remote from the portion thereof engaging said rim and an intermediate ledge engageable and cooperating with said beveled spoke-ends for supporting the rim at points spaced laterally from the beveled rib support.

2. In a vehicle wheel, the combination of a hub and spoke structure, the spokes of which have beveled end faces, an annular rim having a marginal gutter, means for supporting the rim, at points axially spaced from said marginal gutter, upon said beveled end faces of the spokes, and clamps on the respective spokes engaging said marginal gutter, said clamps having portions thereof engaging the beveled ends of the spokes.

WINFIELD S. BRINK.